(12) United States Patent
Agarwal et al.

(10) Patent No.: US 9,225,845 B2
(45) Date of Patent: *Dec. 29, 2015

(54) METHODS AND APPARATUS FOR COLLECTING INFORMATION ABOUT PORTABLE DEVICE USAGE

(71) Applicant: The Nielsen Company (US), LLC, Schaumburg, IL (US)

(72) Inventors: Kanishka Agarwal, San Francisco, CA (US); Brian T. Monighetti, San Ramon, CA (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/914,278

(22) Filed: Jun. 10, 2013

(65) Prior Publication Data

US 2013/0281050 A1    Oct. 24, 2013

Related U.S. Application Data

(63) Continuation of application No. 13/563,147, filed on Jul. 31, 2012, now Pat. No. 8,463,233, which is a continuation of application No. 11/824,276, filed on Jun. 28, 2007, now Pat. No. 8,260,252.

(60) Provisional application No. 60/849,054, filed on Oct. 2, 2006.

(51) Int. Cl.
*H04M 11/00* (2006.01)
*H04M 15/00* (2006.01)
*H04L 12/26* (2006.01)

(52) U.S. Cl.
CPC ........... *H04M 15/59* (2013.01); *H04L 43/0817* (2013.01)

(58) Field of Classification Search
CPC .................................................. H04W 88/06
USPC ...................................... 455/405–408, 552.1
See application file for complete search history.

(56) References Cited

U.S. PATENT DOCUMENTS

| 4,099,591 A | 7/1978 | Carr |
| 4,973,952 A | 11/1990 | Malec et al. |

(Continued)

FOREIGN PATENT DOCUMENTS

| JP | 11259422 | 9/1999 |
| WO | 02073885 | 9/2002 |

(Continued)

OTHER PUBLICATIONS

Jain et al. "Congestion Avoidance in Computer Networks With a Connectionless Network Layer," Digital Equipment Corporation, Copyright 1988, Version: Jun. 1, 1997 (21 pages).

(Continued)

*Primary Examiner* — Temica M Beamer
(74) *Attorney, Agent, or Firm* — Hanley, Flight & Zimmerman, LLC

(57) ABSTRACT

An example method of collecting information on a mobile device about interactive gaming via a hosted service over the Internet involves monitoring usage of the mobile device. The monitoring is performed on the mobile device while the mobile device is being used for the interactive gaming. The example method also involves collecting usage information corresponding to the interactive gaming between the mobile device and a second end-user device in communication with the mobile device via the hosted service over the Internet.

26 Claims, 10 Drawing Sheets

(56) References Cited

U.S. PATENT DOCUMENTS

| | | | |
|---|---|---|---|
| 4,990,892 A | 2/1991 | Guest et al. |
| 5,014,206 A | 5/1991 | Scribner et al. |
| 5,119,104 A | 6/1992 | Heller |
| 5,214,687 A | 5/1993 | Kanaskoski et al. |
| 5,233,642 A | 8/1993 | Renton |
| 5,241,534 A | 8/1993 | Omuro et al. |
| 5,287,266 A | 2/1994 | Malec et al. |
| 5,319,638 A | 6/1994 | Lin |
| 5,345,392 A | 9/1994 | Mito et al. |
| 5,444,745 A | 8/1995 | Ali-Vehmas |
| 5,483,468 A | 1/1996 | Chen et al. |
| 5,497,373 A | 3/1996 | Hulen et al. |
| 5,521,907 A | 5/1996 | Ennis, Jr. et al. |
| 5,603,095 A | 2/1997 | Uola |
| 5,642,353 A | 6/1997 | Roy, III et al. |
| 5,675,510 A | 10/1997 | Coffey et al. |
| 5,692,215 A | 11/1997 | Kutzik et al. |
| 5,799,154 A | 8/1998 | Kuriyan |
| 5,859,838 A | 1/1999 | Soliman |
| 5,978,657 A | 11/1999 | Suzuki |
| 5,987,306 A | 11/1999 | Nilsen et al. |
| 5,991,806 A | 11/1999 | McHann, Jr. |
| 5,999,908 A | 12/1999 | Abelow |
| 6,091,956 A | 7/2000 | Hollenberg |
| 6,108,637 A | 8/2000 | Blumenau |
| 6,115,680 A | 9/2000 | Coffee et al. |
| 6,353,929 B1 | 3/2002 | Houston |
| 6,397,256 B1 | 5/2002 | Chan et al. |
| 6,442,748 B1 | 8/2002 | Bowman-Amuah |
| 6,470,386 B1 | 10/2002 | Combar et al. |
| 6,477,580 B1 | 11/2002 | Bowman-Amuah |
| 6,480,497 B1 | 11/2002 | Flammer, III et al. |
| 6,516,189 B1 | 2/2003 | Frangione et al. |
| 6,526,413 B2 | 2/2003 | Schwitters et al. |
| 6,581,025 B2 | 6/2003 | Lehrman |
| 6,587,835 B1 | 7/2003 | Treyz et al. |
| 6,606,605 B1 | 8/2003 | Kolls |
| 6,647,269 B2 | 11/2003 | Hendrey et al. |
| 6,697,944 B1 | 2/2004 | Jones et al. |
| 6,745,011 B1 | 6/2004 | Hendrickson et al. |
| 6,754,470 B2 | 6/2004 | Hendrickson et al. |
| 6,757,543 B2 | 6/2004 | Moran et al. |
| 6,763,458 B1 | 7/2004 | Watanabe et al. |
| 6,807,515 B2 | 10/2004 | Vogel et al. |
| 6,816,886 B2 | 11/2004 | Elvanoglu et al. |
| 6,834,308 B1 | 12/2004 | Ikezoye et al. |
| 6,837,436 B2 | 1/2005 | Swartz et al. |
| 6,840,861 B2 | 1/2005 | Jordan et al. |
| 6,883,168 B1 | 4/2005 | James et al. |
| 6,912,507 B1 | 6/2005 | Phillips et al. |
| 6,920,550 B2 | 7/2005 | Des li |
| 6,928,280 B1 | 8/2005 | Xanthos et al. |
| 6,968,178 B2 | 11/2005 | Pradhan et al. |
| 6,973,491 B1 | 12/2005 | Staveley et al. |
| 7,010,107 B1 | 3/2006 | Lee et al. |
| 7,013,136 B2 | 3/2006 | Frangione et al. |
| 7,072,640 B2 | 7/2006 | Bernhart |
| 7,093,243 B2 | 8/2006 | Bailey et al. |
| 7,127,261 B2 | 10/2006 | Van Erlach |
| 7,149,549 B1 | 12/2006 | Ortiz et al. |
| 7,155,210 B2 | 12/2006 | Benson |
| 7,171,157 B2 | 1/2007 | Lee |
| 7,181,519 B2 | 2/2007 | Pillai et al. |
| 7,194,758 B1 | 3/2007 | Waki et al. |
| 7,206,647 B2 | 4/2007 | Kumar |
| 7,209,473 B1 | 4/2007 | Mohaban et al. |
| 7,227,498 B2 | 6/2007 | Soliman |
| 7,319,847 B2 | 1/2008 | Xanthos et al. |
| 7,356,590 B2 | 4/2008 | Wilson et al. |
| 7,426,717 B1 | 9/2008 | Schang et al. |
| 7,441,246 B2 | 10/2008 | Auerbach et al. |
| 7,474,645 B2 | 1/2009 | Lundin |
| 7,478,099 B1 | 1/2009 | Gandhi et al. |
| 7,479,899 B2 | 1/2009 | Horsetmeyer |
| 7,504,966 B2 | 3/2009 | Horsetmeyer |
| 7,523,191 B1 | 4/2009 | Thomas et al. |
| 7,548,915 B2 | 6/2009 | Ramer et al. |
| 7,551,922 B2 | 6/2009 | Roskowski et al. |
| 7,555,571 B1 | 6/2009 | Skinner |
| 7,561,069 B2 | 7/2009 | Horsetmeyer |
| 7,562,367 B1 | 7/2009 | Arad |
| 7,609,650 B2 | 10/2009 | Roskowski et al. |
| 7,623,823 B2 | 11/2009 | Zito et al. |
| 7,627,872 B2 | 12/2009 | Hebeler et al. |
| 7,680,802 B2 | 3/2010 | Kato |
| 7,689,521 B2 | 3/2010 | Nodelman et al. |
| 7,693,817 B2 | 4/2010 | Dumais et al. |
| 7,733,799 B2 | 6/2010 | Kalliola et al. |
| 7,742,762 B1 | 6/2010 | Biere et al. |
| 7,751,385 B2 | 7/2010 | Monk et al. |
| 7,756,829 B2 | 7/2010 | Bhanote |
| 7,861,225 B2 | 12/2010 | Lee |
| 7,899,915 B2 | 3/2011 | Reisman |
| 7,949,677 B2 | 5/2011 | Croft et al. |
| 7,954,150 B2 | 5/2011 | Croft et al. |
| 8,010,679 B2 | 8/2011 | Low et al. |
| 8,014,726 B1 | 9/2011 | Petersen et al. |
| 8,051,180 B2 | 11/2011 | Mazzaferri et al. |
| 8,073,565 B2 | 12/2011 | Johnson |
| 8,161,172 B2 | 4/2012 | Reisman |
| 8,185,351 B2 | 5/2012 | Crystal et al. |
| 8,214,429 B2* | 7/2012 | Chidel et al. ................. 709/203 |
| 8,260,252 B2 | 9/2012 | Agarwal |
| 8,321,556 B1 | 11/2012 | Chatterjee et al. |
| 8,363,650 B2 | 1/2013 | Rao et al. |
| 8,489,669 B2 | 7/2013 | Johnson |
| 8,538,343 B2 | 9/2013 | Petersen et al. |
| 8,549,133 B2 | 10/2013 | Vaver |
| 9,008,586 B2 | 4/2015 | Petersen et al. |
| 2001/0028301 A1 | 10/2001 | Geiger et al. |
| 2001/0047291 A1 | 11/2001 | Garah et al. |
| 2002/0002504 A1 | 1/2002 | Engel et al. |
| 2002/0025795 A1 | 2/2002 | Sharon et al. |
| 2002/0046090 A1 | 4/2002 | Stewart |
| 2002/0069037 A1 | 6/2002 | Hendrickson et al. |
| 2002/0112048 A1 | 8/2002 | Gruyer et al. |
| 2002/0160758 A1 | 10/2002 | Pradhan et al. |
| 2003/0054757 A1 | 3/2003 | Kolessar et al. |
| 2003/0115586 A1 | 6/2003 | Lejouan et al. |
| 2003/0149743 A1* | 8/2003 | Baluja et al. ................. 709/217 |
| 2003/0177488 A1 | 9/2003 | Smith et al. |
| 2004/0133672 A1 | 7/2004 | Bhattacharya et al. |
| 2004/0243587 A1 | 12/2004 | Nuyens et al. |
| 2004/0260470 A1 | 12/2004 | Rast |
| 2004/0267694 A1 | 12/2004 | Sakai et al. |
| 2005/0136903 A1 | 6/2005 | Kashima et al. |
| 2005/0144632 A1 | 6/2005 | Mears et al. |
| 2005/0155019 A1 | 7/2005 | Levine et al. |
| 2005/0216509 A1 | 9/2005 | Kolessar et al. |
| 2005/0216844 A1 | 9/2005 | Error et al. |
| 2006/0004627 A1 | 1/2006 | Baluja |
| 2006/0019723 A1 | 1/2006 | Vorenkamp et al. |
| 2006/0129972 A1 | 6/2006 | Tyburski et al. |
| 2006/0218533 A1 | 9/2006 | Koduru et al. |
| 2006/0270401 A1 | 11/2006 | Frangione et al. |
| 2006/0294225 A1 | 12/2006 | Grecco et al. |
| 2007/0011040 A1 | 1/2007 | Wright et al. |
| 2007/0038516 A1 | 2/2007 | Apple et al. |
| 2007/0150599 A1 | 6/2007 | Neogi et al. |
| 2007/0260475 A1 | 11/2007 | Bhanote |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0002677 A1 | 1/2008 | Bugenhagen et al. |
| 2008/0076506 A1 | 3/2008 | Nruyen et al. |
| 2008/0109295 A1 | 5/2008 | McConochie et al. |
| 2008/0126420 A1 | 5/2008 | Wright et al. |
| 2008/0140479 A1 | 6/2008 | Mello et al. |
| 2010/0030785 A1 | 2/2010 | Wilson et al. |
| 2010/0125657 A1 | 5/2010 | Dowling et al. |
| 2010/0205220 A1 | 8/2010 | Hart et al. |

(56) References Cited

U.S. PATENT DOCUMENTS

| | | | |
|---|---|---|---|
| 2010/0205301 | A1 | 8/2010 | Ansari et al. |
| 2011/0321035 | A1 | 12/2011 | Petersen et al. |
| 2012/0121043 | A1 | 5/2012 | Wambacq |
| 2014/0019203 | A1 | 1/2014 | Petersen et al. |
| 2014/0237595 | A1 | 8/2014 | Sridhara et al. |

FOREIGN PATENT DOCUMENTS

| | | |
|---|---|---|
| WO | 02098029 | 12/2002 |
| WO | 2006098414 | 9/2006 |

OTHER PUBLICATIONS

Balakrishnan et al. "A Comparison of Mechanisms for Improving TCP Performance over Wireless Links," ACM SIGCOMM '96, Stanford, CA, Aug. 1996 (14 pages).

Vucetic, Jelena & Kline,Paul, "Network Management Applications for Wireless Local Loop," Electrotechnical Conference, May 1998, vol. 2 (pp. 787-791).

Ko, Y.F. "Automatic Call Generation and Analysis-Network Testing and Cellularsurvey Tools," Making Life Easier-Network Design and Management Tools (Digest No: 1996/217), Oct. 10, 1996 (pp. 7/1-7/6).

Wagner, David P. Battelle. Report: Lexington Area Travel Data Collection Test; GPS for Personal Travel Surveys. Final Report for Office of Highway Information Management, Office of Technology Application, and Federal Highway Administration, Sep. 1997, (92 pages).

International Bureau, "International Preliminary Report on Patentability", for PCT application Serial No. PCT/US2007/080235, mailed Apr. 16, 2009 (8 pages).

Patent Cooperation Treaty, "Written Opinion of the International Searching Authority," issued by the International Searching Authority in connection with international counterpart PCT application No. PCT/US2008/056282, mailed Aug. 21, 2008, 5 pages.

Patent Cooperation Treaty, "International Search Report," issued by the International Searching Authority in connection with international counterpart PCT application No. PCT/US2008/056282, mailed Aug. 21, 2008, 5 pages.

Patent Cooperation Treaty, "International Search Report," issued by the International Searching Authority in connection with international counterpart PCT application No. PCT/US2007/080235, mailed Aug. 25, 2008, 4 pages.

Patent Cooperation Treaty, "Written Opinion of the International Searching Authority," issued by the International Searching Authority in connection with international counterpart PCT application No. PCT/US2007/080235, mailed Aug. 25, 2008, 7 pages.

\* cited by examiner

METHODS AND APPARATUS FOR COLLECTING INFORMATION ABOUT PORTABLE DEVICE USAGE

PRIORITY

This is a continuation of U.S. patent application Ser. No. 13/563,147, filed Jul. 31, 2012, which is a continuation of U.S. patent application Ser. No. 11/824,276, filed Jun. 28, 2007, which claims priority to U.S. Provisional Application No. 60/849,054, filed on Oct. 2, 2006, all of which are hereby incorporated by reference herein in their entireties.

BACKGROUND

Although cellular phones and other wireless devices were originally used for basic call placement, mobile phones now incorporate many new technologies and features. For example, data messaging in the form of SMS or MMS is common. Additionally, internet connectivity over cellular networks and wireless internet access points (e.g., using Wi-Fi, etc.) has enabled internet browsing, content downloading, mobile commerce transactions, email activity, and the like.

With the advent of these new features and the services to support such features, cellular providers and other wireless industry participants have realized a need for information on usage of these features and services. Consumer usage information is desirable for advertising, marketing, strategic business planning, and various other business uses. However, obtaining such information has proven to be costly, difficult, or otherwise impossible using conventional data collection techniques.

For example, conventional data collection techniques are unable to obtain usage information related to "on-portal" and "off-portal" usage. On-portal usage refers to interaction with an internet website (e.g., uploading to, downloading from, etc.) of a carrier providing wireless service for the cellular phone, while off-portal usage is interaction with an internet website which is not affiliated with the carrier. Although on-portal usage may be monitored by the carrier (e.g., by monitoring internet activity with servers hosting their internet portals), it is difficult and/or impossible for third-parties to monitor such usage. Further, off-portal usage cannot be directly monitored by carriers given that the interaction is not with servers of the respective carriers.

Collection of "on-network" and "off-network" data usage is also limited using the conventional collection techniques. On-network data usage refers to interaction over a network (e.g., a cellular network) of a carrier providing wireless service for the cellular phone, while off-network data usage is interaction over a network which is not affiliated with the carrier. Although on-network data usage may be monitored by the carrier, it is difficult and/or impossible for third-parties to monitor such usage. Further, off-network data usage cannot be directly monitored by carriers given that the interaction is over networks affiliated with other business entities.

Conventional data collection techniques are also inadequate to monitor interactive and/or "real-time" usage. For example, methodologies to monitor usage associated with streaming media (e.g., mobile TV, internet radio, etc.), interactive gaming, and mobile conferencing have neither been proposed nor devised.

Additionally, many cellular phones and other wireless devices are now equipped for wireless internet protocol (IP) communication (e.g., Wi-Fi, etc.). Wireless IP usage is difficult to monitor given that such interactions are not over a single network or via a single internet server. Additionally, there are many types of wireless IP networks, which further complicates monitoring such usage. Further, there are many small wireless IP networks affiliated with many different business entities, thereby thwarting usage monitoring by any single business entity and making payment tracking between the business entities (e.g., affiliated with the wireless IP networks relinquishing and receiving subscribers) impossible.

SUMMARY

Accordingly, a need exists to monitor and collect data for portable device usage with reduced cost and difficulty. Additionally, a need exists to obtain information for on-portal and off-portal usage of portable devices, as well as on-network and off-network data usage. A need also exists to monitor and collect data for interactive usage of portable devices. Further, a need exists to obtain information on wireless internet protocol (IP) usage of portable devices. Examples of the present disclosure provide novel solutions to these needs and others as described below.

Examples of the present disclosure are directed to methods and portable devices for collecting information about portable device usage. More specifically, examples provide convenient, efficient, and cost-effective methods of monitoring and collecting information about on-portal/off-portal usage, on-network/off-network data usage, interactive (e.g., streaming media, interactive gaming, mobile conferencing, etc.) usage, and wireless IP usage, where the portable device usage is monitored by the portable device itself.

By utilizing components of the portable device itself to monitor the portable device usage, information may be collected across various internet portals and/or networks. As such, embodiments enable the collection of information for on-portal/off-portal usage as well as on-network/off-network data usage. Additionally, the monitoring of interactive usage on the portable device provides complete and representative information regarding interactions of the portable device with many different servers, systems, portable devices, etc. Further, by centralizing the monitoring and collection of information related to wireless IP usage on the portable device itself, difficulties presented by the numerous wireless IP networks and/or internet servers in communication with the portable device, numerous types of wireless IP networks, and numerous business entities affiliated with the wireless IP networks are reduced.

BRIEF DESCRIPTION OF THE DRAWINGS

The present disclosure is illustrated by way of example, and not by way of limitation, in the figures of the accompanying drawings and in which like reference numerals refer to similar elements.

DETAILED DESCRIPTION

Figure 1:
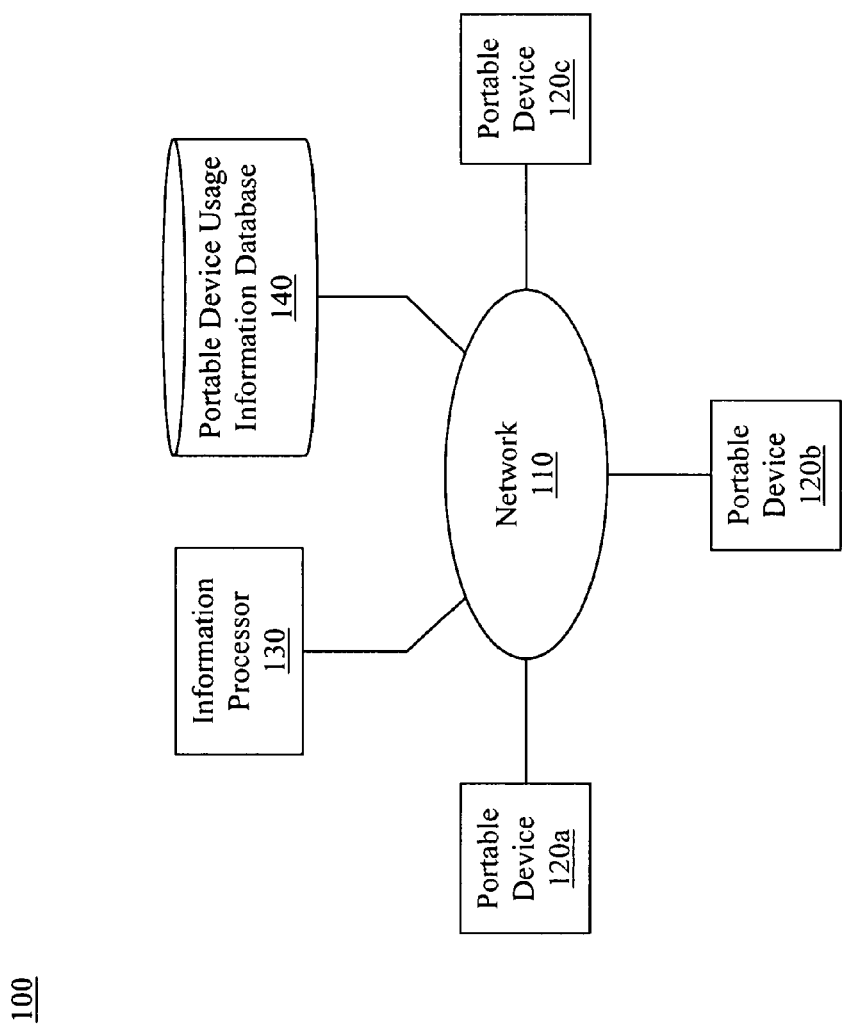
FIG. 1 shows an example system for collecting information about portable device usage in accordance with some examples of the present disclosure.

Reference will now be made in detail to examples of the present disclosure, examples of which are illustrated in the accompanying drawings. While the present disclosure will be discussed in conjunction with the following examples, it will be understood that they are not intended to limit the present disclosure to these examples alone. On the contrary, the present disclosure is intended to cover alternatives, modifications, and equivalents which may be included with the spirit and scope of the present disclosure as defined by the appended claims. Furthermore, in the following detailed description of the present disclosure, numerous specific details are set forth in order to provide a thorough understanding of the present disclosure. However, embodiments of the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing the terms such as "accepting," "accessing," "adding," "analyzing," "assembling," "assigning," "calculating," "capturing," "combining," "comparing," "collecting," "creating," "defining," "depicting," "detecting," "determining," "displaying," "establishing," "executing," "generating," "grouping," "identifying," "initiating," "interacting," "modifying," "monitoring," "moving," "outputting," "performing," "placing," "presenting," "processing," "programming," "querying," "removing," "repeating," "sampling," "sorting," "storing," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the Disclosure

FIG. 1 shows example system 100 for collecting information about portable device usage in accordance with some examples of the present disclosure. As shown in FIG. 1, network 110 may comprise a wired and/or wireless network, where network 110 couples portable devices 120a-120c. Portable devices 120a-120c may comprise cellular telephones, portable gaming devices, portable media devices, portable digital assistants (PDAs), hand-held computer systems, etc. In some examples, network 110 may comprise the internet. Additionally, Information processor 130 and portable device usage information database 140 are coupled via network 120.

One or more of portable devices 120a-120c may comprise a respective information collection component for collecting usage information from the portable device. Usage information collected from each portable device (e.g., 120a-120c) may be communicated over network 120 to information processor 130 for processing and/or storage in database 140. It should be appreciated that processor 130 and database 140 may be integrated within the same system in some examples, where database 140 may comprise a memory of the system.

Portable devices 120a-120c may comprise a panel of wireless devices, where users of the portable devices (e.g., 120a-120c) may comprise a panel of users. The panel's usage of the portable devices may be used to determine various metrics concerning the mobile device. For example, metrics concerning portable device usage associated with an internet portal status, a wireless network status, streaming media, interactive gaming, mobile conferencing, and wireless internet protocol (IP) usage may be determined as discussed with regard to the subsequent figures below.

Figure 2:
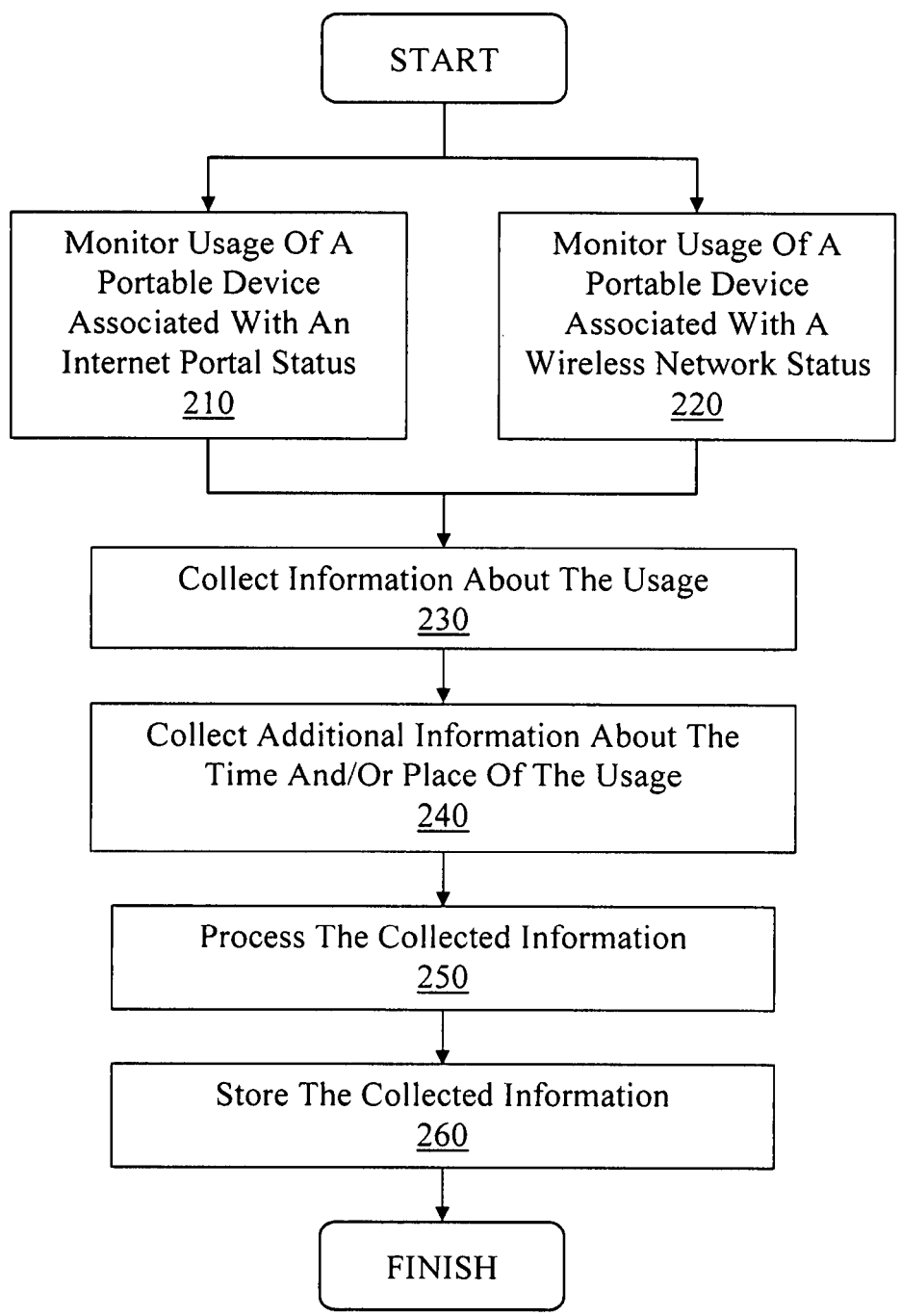
FIG. 2 shows an example process for collecting information about portable device usage associated with at least one of an internet portal status and a wireless network status in accordance with some examples of the present disclosure.

FIG. 2 shows example process 200 for collecting information about portable device usage associated with at least one of an internet portal status and a wireless network status in accordance with some examples of the present disclosure. As shown in FIG. 2, step 210 involves monitoring usage of a portable device (e.g., 120a-120c) associated with an internet portal status. In one embodiment, the internet portal status may comprise "on-portal" and/or "off-portal." As such, on-portal usage (e.g., interaction with a website of the carrier providing service to the portable device) and/or off-portal usage (e.g., interaction with a website which is not affiliated with the carrier) of the portable device may be monitored in step 210.

Step 220 involves monitoring usage of a portable device (e.g., 120a-120c) associated with a wireless network status. In one embodiment, the wireless network status may comprise "on-network" and/or "off-network." As such, on-network usage (e.g., interaction over a network of a carrier providing wireless service for the cellular phone) and/or off-network usage (e.g., interaction over a network which is not affiliated with the carrier) of the portable device may be monitored in step 220.

As shown in FIG. 2, step 230 involves collecting information about the usage (e.g., monitored in steps 210 and/or 220). As such, the information collected may comprise on-portal usage information and/or off-portal usage information where on-portal and/or off-portal usage is monitored. Where on-network and/or off-network usage is monitored, the information collected may comprise on-network usage information and/or off-network usage information. And in some examples, the usage information may be collected in accordance with U.S. Pat. Nos. 6,745,011 and 6,754,470, the disclosure of which are hereby incorporated by reference.

Step 240 involves collecting additional information about the time and/or place of the usage (e.g., monitored in steps 210 and/or 220). Thereafter, the collected information (e.g., that collected in steps 230 and/or 240) may be processed in step 250. Processing may comprise cleaning, organizing, filtering, sorting, encoding, encrypting, applying time and/or location stamps to, etc. the data. In some examples, the collected information may be processed by the portable device (e.g., 120a-120c) and/or by an external system (e.g., processor 130). After processing, the information may be stored in step 260. In some examples, the information may be stored in the portable device (e.g., 120a-120c) and/or in an external memory (e.g., database 140).

Figure 3:
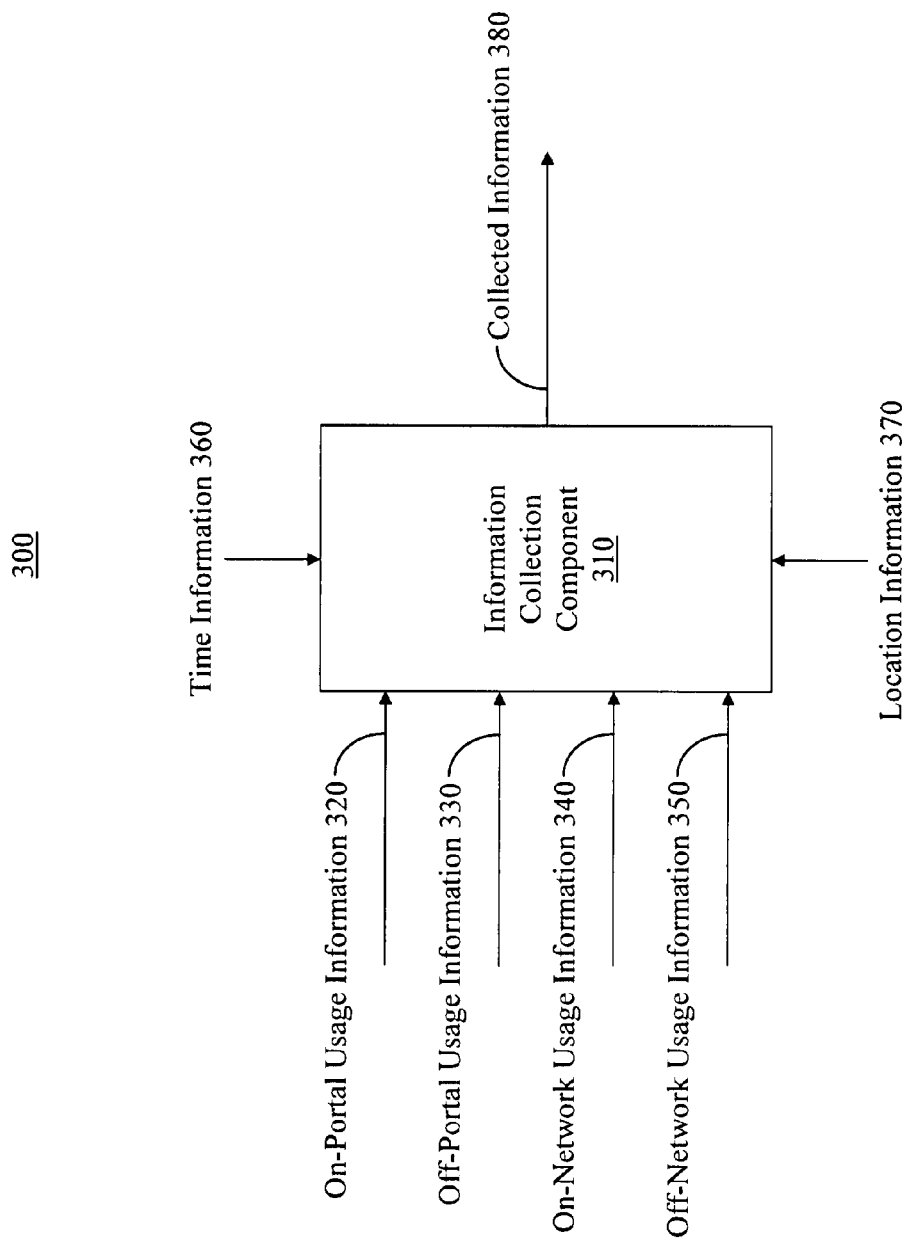
FIG. 3 shows an example portable device for collecting information about portable device usage associated with at least one of an internet portal status and a wireless network status in accordance with some examples of the present disclosure.

FIG. 3 shows example portable device 300 for collecting information about portable device usage associated with at least one of an internet portal status and a wireless network status in accordance with some examples of the present disclosure. In some examples, portable device 300 may be used to implement any of portable devices 120a-120c of FIG. 1.

As shown in FIG. 3, portable device 300 comprises information collection component 310 for monitoring (e.g., in accordance with steps 210 and/or 220 of FIG. 2) and collecting (e.g., in accordance with step 230 of FIG. 2) on-portal usage information 320, off-portal usage information 330, on-network usage information 340, off-network usage information 350, or any combination thereof. Component 310 may also monitor time information 360 and location information 370, where information 360 and/or 370 may be used to determine a time and/or place of usage associated with information 320-350, or any subset thereof (e.g., in accordance with step 240 of FIG. 2). As such, in some examples, information 360 may be used to time stamp a given usage of portable device 300, whereas information 370 may be used to location stamp a given usage of portable device 300.

After collecting information 320-370, or any subset thereof, component 310 may output collected information 380. In some examples, information 380 may be output to a processor (e.g., for processing) and/or memory (e.g., for storage) of portable device 300. Alternatively, information 380 may be output to an external processor {e.g., 130) and/or external memory (e.g., 140).

Thus, by utilizing components (e.g., 310) of the portable device (e.g., 300) itself to monitor the portable device usage (e.g., as represented by information 320-370 input to component 310), information may be collected across various internet portals and/or networks. As such, examples enable the collection of information for on-portal/off-portal usage as well as on-network/off-network data usage. Additionally, the information collected may be more complete and representative of actual device usage given that it is monitored and collected on the portable device itself. Further, examples enable a single entity to collect the complete and representative usage information from the portable device (e.g., 300), where the entity may be in agreement (e.g., opt-in, etc.) with a user of the portable device (e.g., 300) regarding the collection of such usage information.

Figure 4:
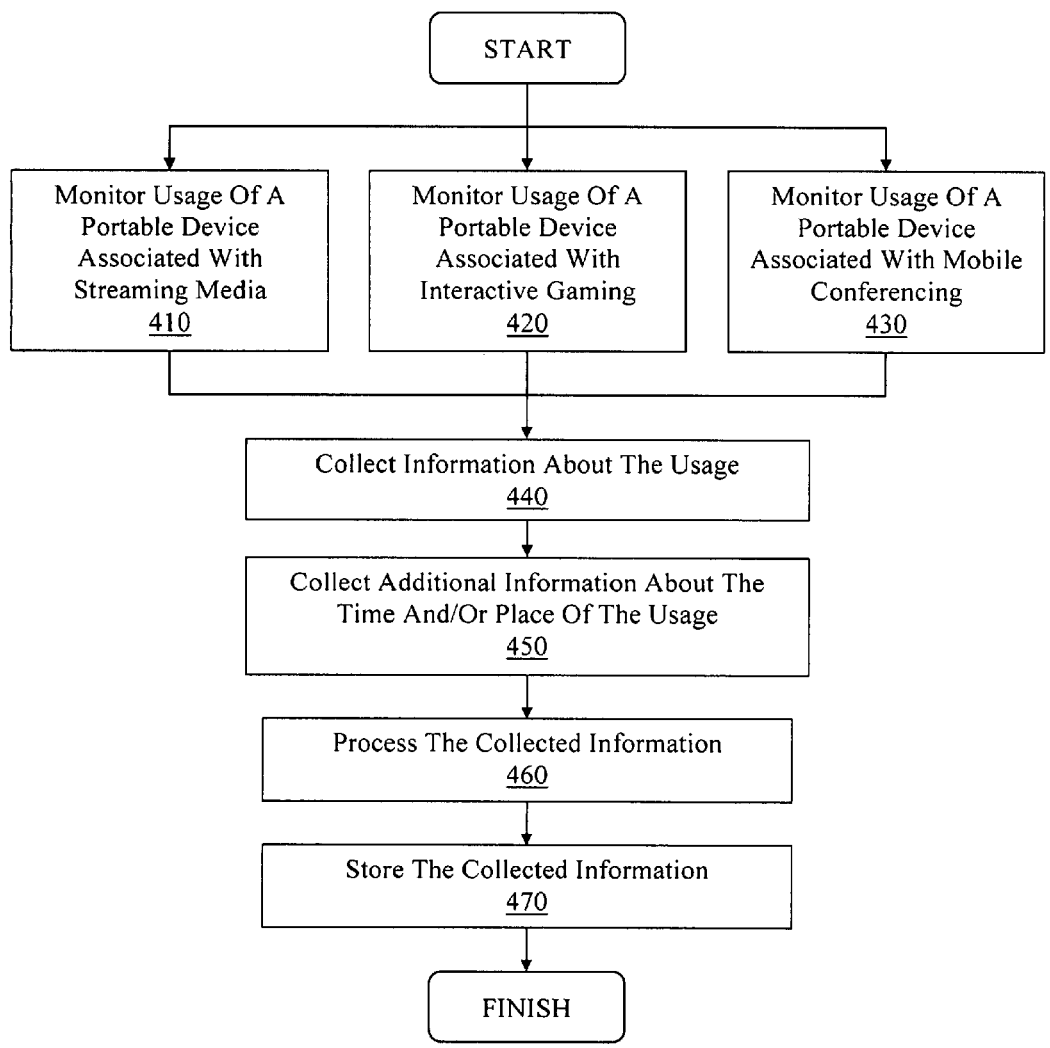
FIG. 4 shows an example process for collecting information about portable device usage associated with at least one of streaming media, interactive gaming, and mobile conferencing in accordance with some examples of the present disclosure.

FIG. 4 shows example process 400 for collecting information about portable device usage associated with at least one of streaming media, interactive gaming, and mobile conferencing in accordance with some examples of the present disclosure. As shown in FIG. 4, step 410 involves monitoring the usage of a portable device (e.g., 120a-120c of FIG. 1) associated with streaming media (e.g., mobile TV, internet radio, etc.). The media may comprise audio and/or video streamed from a content source to the portable device (e.g., 120a-120c). In some examples, the usage may comprise inputs by a user (e.g., changing channels, adjusting the volume, etc.) to the portable device and/or the content source. Alternatively, the usage may comprise characteristics of the content stream (e.g., identification of the content, data embedded in the stream, changes in the content stream, etc.).

Step 420 involves monitoring usage of a portable device (e.g., 120a-120c of FIG. 1) associated with interactive gaming. The interactive game may be played from the portable device (e.g., 120a-120c) with or against users of systems or devices in communication with the portable device (e.g., 120a-120c). The usage may comprise inputs by a user (e.g., to play the game, to adjust play options, etc.) to the portable device and/or the content source. Alternatively, the usage may comprise characteristics of the interactive game play (e.g., number of users playing the game, type of interaction, frequency of the interaction, duration of the interaction, etc.).

As shown in FIG. 4, step 430 involves monitoring usage of a portable device (e.g., 120a-120c of FIG. 1) associated with mobile conferencing. The mobile conferencing may comprise simultaneous connection (e.g., enabling communication) between three or more portable devices in some examples. The usage may comprise inputs by a user (e.g., to initiate a call, to setup the conferencing, to communicate with other conferencing devices, etc.) to the portable device and/or other devices (e.g., engaged in the mobile conference). Alternatively, the usage may comprise characteristics of the mobile conferencing (e.g., number of devices involved in the mobile conferencing, duration of the mobile conference, content of the communications between conferencing devices, etc.).

As shown in FIG. 4, step 440 involves collecting information about the usage (e.g., monitored in steps 410, 420, 430, or a combination thereof). As such, the information collected may comprise streaming media usage information where streaming media usage is monitored. Where interactive gaming usage is monitored, the information collected may comprise interactive gaming usage information. Additionally, the information collected may comprise mobile conferencing usage information where mobile conferencing is monitored. In some examples, the information may be collected in real-time. And in some examples, the usage information may be collected in accordance with U.S. Pat. Nos. 6,745,011 and 6,754,470, the disclosure of which are hereby incorporated by reference.

Step 450 involves collecting additional information about the time and/or place of the usage (e.g., monitored in steps 410, 420, 430, or a combination thereof). In some examples, the additional information may be collected in realtime. Thereafter, the collected information (e.g., that collected in steps 440 and/or 450) may be processed in step 460. Processing may comprise cleaning, organizing, filtering, sorting, encoding, encrypting, applying time and/or location stamps to, etc. the data. In some examples, the collected information may be processed by the portable device (e.g., 120a-120c) and/or by an external system (e.g., processor 130). After processing, the information may be stored in step 470. In some examples, the information may be stored in the portable device (e.g., 120a-120c) and/or in an external memory (e.g., database 140).

Figure 5:
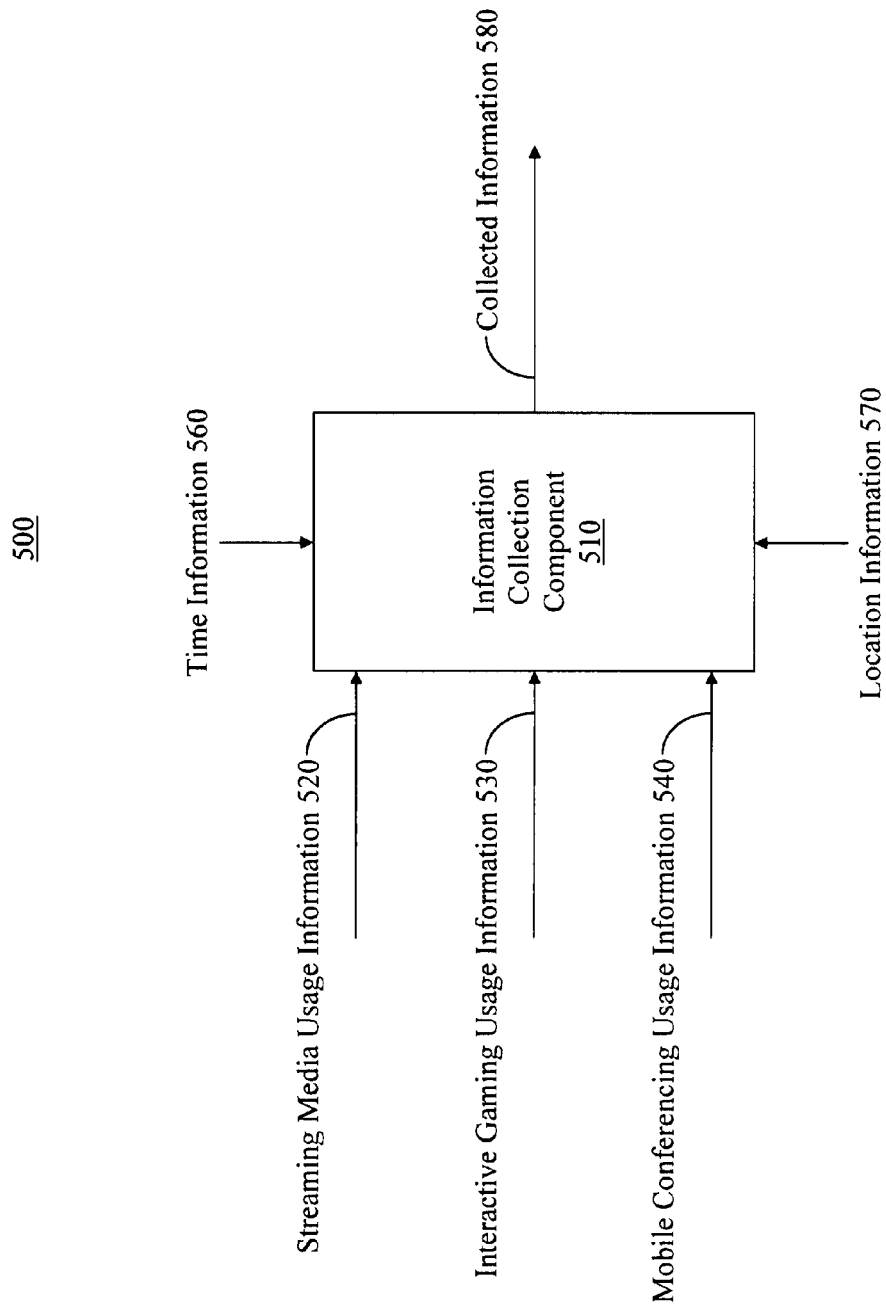
FIG. 5 shows an example portable device for collecting information about portable device usage associated with at least one of streaming media, interactive gaming, and mobile conferencing in accordance with some examples of the present disclosure.

FIG. 5 shows example portable device 500 for collecting information about portable device usage associated with at least one of streaming media, interactive gaming, and mobile conferencing in accordance with some examples of the present disclosure. In some examples, portable device 500 may be used to implement any of portable devices 120a-120c of FIG. 1.

As shown in FIG. 5, portable device 500 comprises information collection component 510 for monitoring (e.g., in accordance with steps 410, 420, 430, or a combination thereof of FIG. 4) and collecting (e.g., in accordance with step 440 of FIG. 4) streaming media usage information 520, interactive gaming usage information 530, mobile conferencing usage information 540, or any combination thereof. Component 510 may also monitor time information 560 and location information 570, where information 560 and/or 570 may be used to determine a time and/or place of usage associated with information 520-540, or any subset thereof (e.g., in accordance with step 450 of FIG. 4). As such, in some examples, information 560 may be used to time stamp a given usage of portable device 500, whereas information 570 may be used to location stamp a given usage of portable device 500.

After collecting information 520-570, or any subset thereof, component 510 may output collected information 580. In some examples, information 580 may be output to a processor (e.g., for processing) and/or memory (e.g., for storage) of portable device 500. Alternatively, information 580 may be output to an external processor (e.g., 130) and/or external memory (e.g., 140).

Thus, by utilizing components (e.g., 510) of the portable device (e.g., 500) itself to monitor the portable device usage (e.g., as represented by information 520-570 input to component 510), information regarding interactions of the portable device with many different servers, systems, portable devices, etc. may be obtained. Additionally, the information collected may be more complete and representative of actual device usage given that it is monitored and collected on the portable device itself. Further, examples enable a single entity to collect the complete and representative usage information from the portable device (e.g., 500), where the entity may be in agreement (e.g., opt-in, etc.) with a user of the portable device (e.g., 500) regarding the collection of such usage information.

Figure 6:
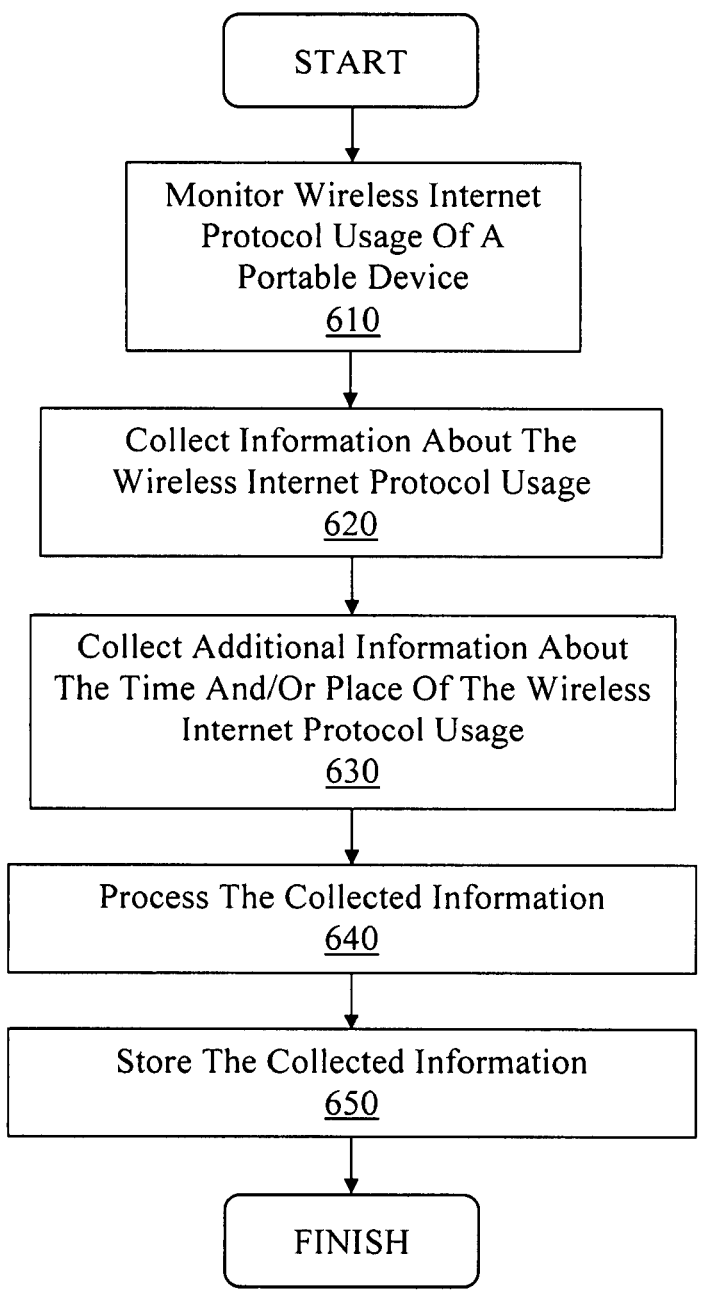
FIG. 6 shows an example process for collecting information about wireless internet protocol usage of a portable device in accordance with some examples of the present disclosure.

FIG. 6 shows example process 600 for collecting information about wireless internet protocol usage of a portable device in accordance with some examples of the present disclosure. As shown in FIG. 6, step 610 involves monitoring wireless IP usage of a portable device (e.g., 120a-120c of FIG. 1). The wireless IP usage (e.g., Wi-Fi, WiMAX, etc.) may comprise any wireless data and/or voice communication (e.g., in accordance with the IEEE 802.11 standard, IEEE 802.16 standard, etc.). For example, wireless IP voice usage may comprise voice usage (e.g., voice over IP (VOIP), etc.) outside a carrier network, where voices or other sounds are transformed in data (e.g., packetized) and communicated as such. Additionally, wireless IP data usage may comprise data usage outside a carrier network, where information other than voices and/or sounds are communicated. The communications may be over one or more wireless IP networks and via one or more internet servers, where the networks may be affiliated with one or more business entities. Additionally, the communications may be communicated over one or more types of wireless IP networks (e.g., Wi-Fi, WiMAX, etc.).

Step 620 involves collecting information about the wireless IP usage (e.g., monitored in step 610). As such, the information collected may comprise wireless IP usage information. In some examples, the information may be collected in real-time. And in some examples, the usage information may be collected in accordance with U.S. Pat. Nos. 6,745,011 and 6,754,470, the disclosure of which are hereby incorporated by reference.

Step 630 involves collecting additional information about the time and/or place of the usage (e.g., monitored in step 610). Thereafter, the collected information (e.g., that collected in steps 620 and/or 630) may be processed in step 640. Processing may comprise cleaning, organizing, filtering, sorting, encoding, encrypting, applying time and/or location stamps to, etc. the data. In some examples, the collected information may be processed by the portable device (e.g., 120a-120c) and/or by an external system (e.g., processor 130). After processing, the information may be stored in step 650. In some examples, the information may be stored in the portable device (e.g., 120a-120c) and/or in an external memory (e.g., database 140).

Figure 7:
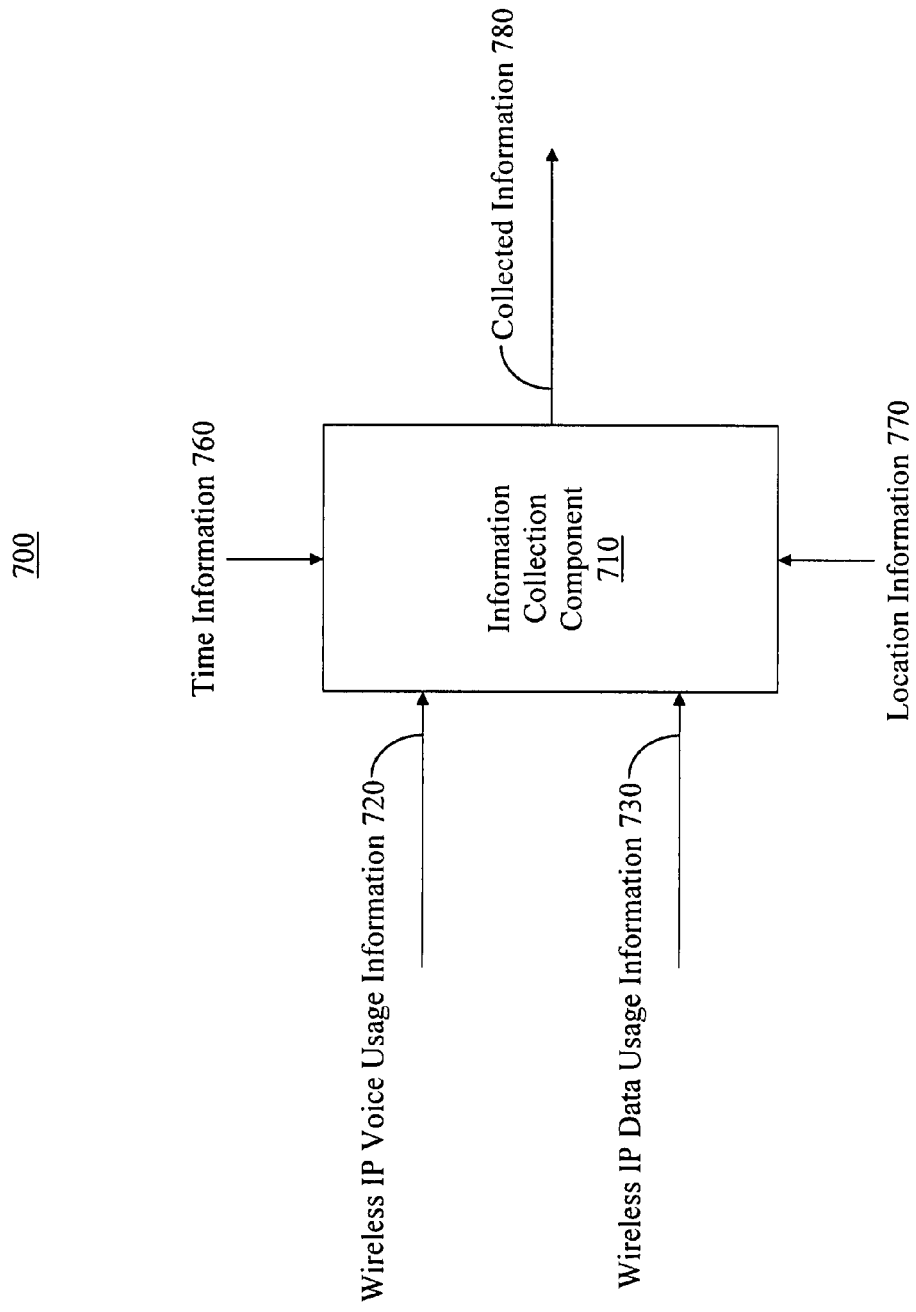
FIG. 7 shows an example portable device for collecting information about wireless internet protocol usage of the portable device in accordance with some examples of the present disclosure.

FIG. 7 shows example portable device 700 for collecting information about wireless internet protocol usage of the portable device in accordance with some examples of the present disclosure. In some examples, portable device 700 may be used to implement any of portable devices 120a-120c of FIG. 1.

As shown in FIG. 7, portable device 700 comprises information collection component 710 for monitoring (e.g., in accordance with step 610 of FIG. 6) and collecting (e.g., in accordance with step 620 of FIG. 6) wireless IP voice usage information 720 and/or wireless IP data usage information 730. Component 710 may also monitor time information 760 and location information 770, where information 760 and/or 770 may be used to determine a time and/or place of usage associated with information 720-740, or any subset thereof (e.g., in accordance with step 630 of FIG. 6). As such, in some examples, information 760 may be used to time stamp a given usage of portable device 700, whereas information 770 may be used to location stamp a given usage of portable device 700.

After collecting information 720-730, or any subset thereof, component 710 may output collected information 780. In some examples, information 780 may be output to a processor (e.g., for processing) and/or memory (e.g., for storage) of portable device 500. Alternatively, information 780 may be output to an external processor (e.g., 130) and/or external memory (e.g., 140).

Thus, by utilizing components (e.g., 710) of the portable device (e.g., 700) itself to monitor the portable device usage (e.g., as represented by information 720-770 input to component 710), information regarding wireless IP communications over one or more wireless IP networks affiliated with one or more business entities, as well as communications over one or more types of wireless IP networks, may be obtained. Additionally, the information collected may be more complete and representative of actual device usage given that it is monitored and collected on the portable device itself. Further, examples enable a single entity to collect the complete and representative usage information from the portable device (e.g., 700), where the entity may be in agreement (e.g., opt-in, etc.) with a user of the portable device (e.g., 700) regarding the collection of such usage information.

Figure 8:
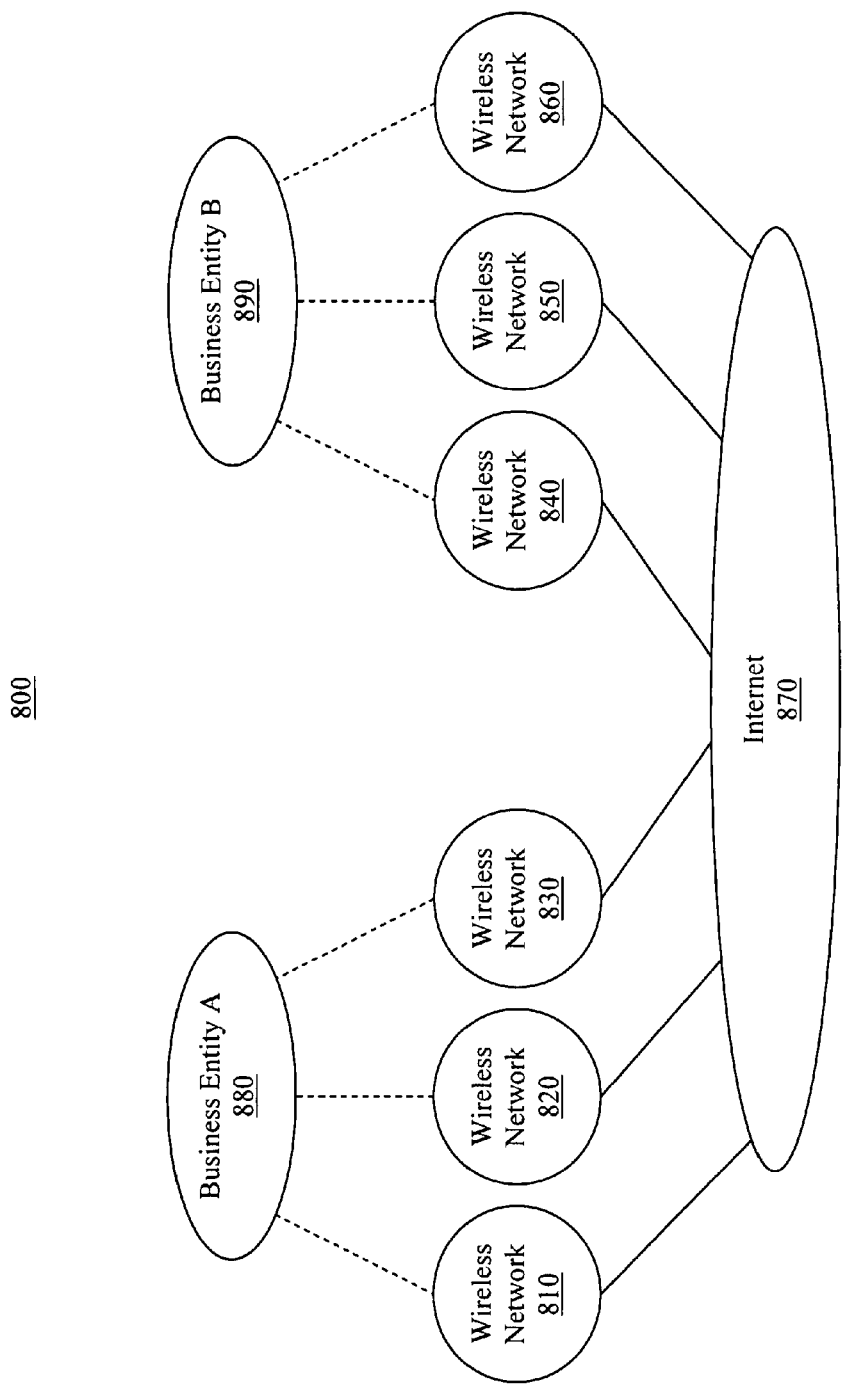
FIG. 8 shows a diagram of example wireless networks grouped by business entity association in accordance with some examples of the present disclosure.

FIG. 8 shows diagram 800 of exemplary wireless networks grouped by business entity association in accordance with some examples of the present disclosure. As shown in FIG. 8, wireless networks 810-860 are coupled to internet 870, where networks 810-830 are associated with business entity 880 and networks 840-860 are associated with business entity 890. Networks 810-860 may comprise wireless IP networks utilizing IEEE 802.11, IEEE 802.16, or other wireless communication standards.

Figure 9:
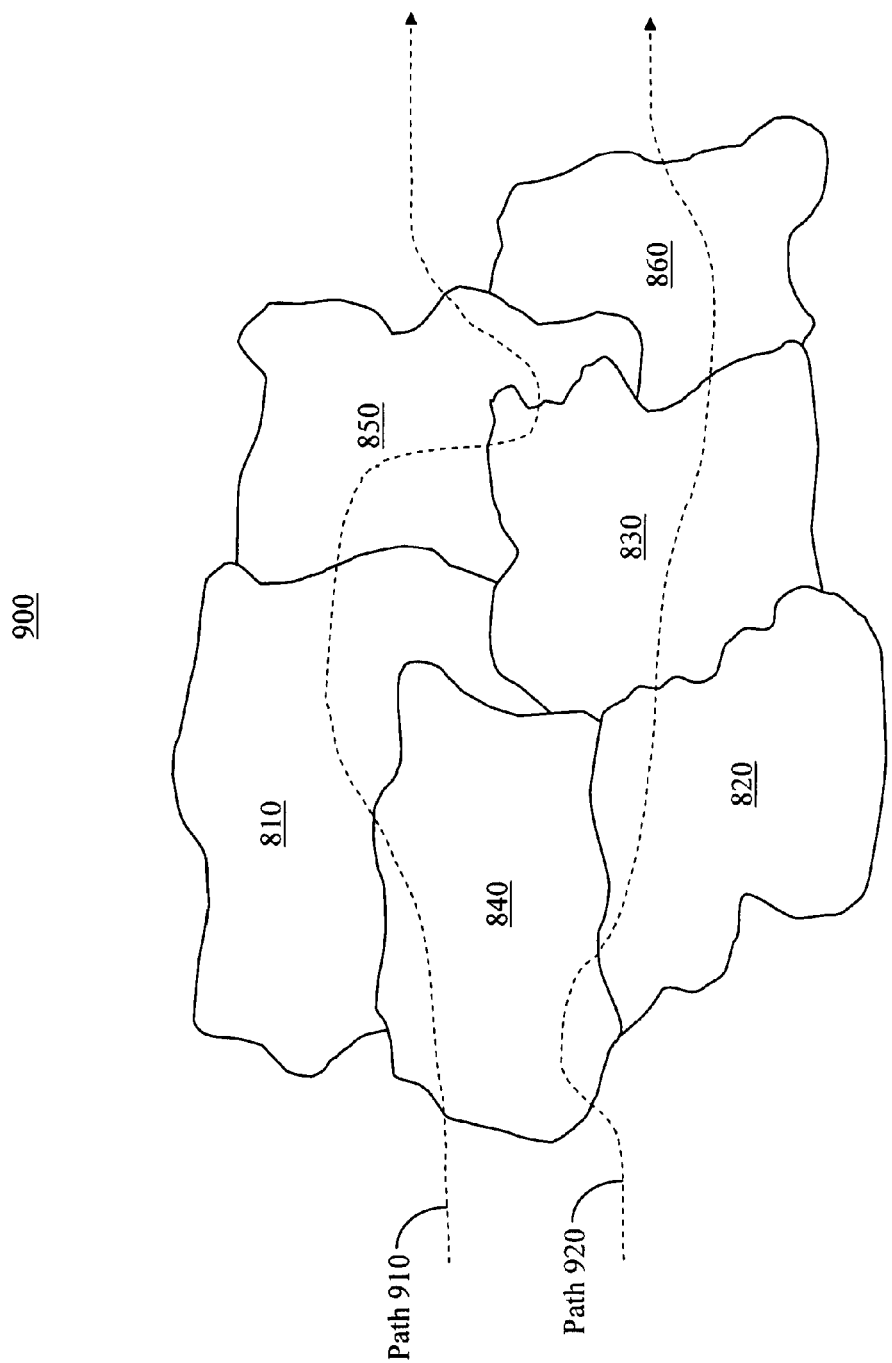
FIG. 9 shows an example geographical layout of example wireless networks in accordance with some examples of the present disclosure.

FIG. 9 shows exemplary geographical layout 900 of exemplary wireless networks 810-860 in accordance with some examples of the present disclosure. As shown in FIG. 9, the networks associated with business entity 880 (e.g., networks 810-830) are not shaded, while the networks associated with business entity 890 (e.g., networks 840-860) are shaded. As such, when traveling along exemplary path 910, a portable device (e.g., 120a-120c, 300, 500, 700, etc.) may communicate with wireless networks 840, 810, 850 and 830, where transitions between wireless networks may occur in the following order: 840, 810, 850, 830 and 850. However, when traveling along exemplary path 920, a portable device (e.g., 120a-120c, 300, 500, 700, etc.) may communicate with wireless networks 840, 820, 830 and 860, where transitions between wireless networks may occur in that order. In some examples, example paths 910 and 920 may represent a change in location of a portable device over time (e.g., when a user carrying the portable device walks through a city, etc.).

In some examples, to provide nearly uninterrupted service as the portable device travels along path (e.g., 910, 920, etc.) through wireless networks 810-860, business entities 880 and 890 can agree to provide service to the other entity's subscribers in exchange for payment, etc. Information regarding such payments between business entities is commonly referred to as "payment tracking." For example, when a subscriber of services provided by business entity 890 travels along path 920 as shown in FIG. 9, business entity 890 may pay business entity 880 for wireless service provided to the subscriber when traveling through wireless networks 820 and 830.

Although business entity 890 may be aware of the subscriber's wireless IP usage when in the geographical areas covered by wireless networks 840 and 860, business entity 890 cannot monitor such wireless IP usage when in wireless networks (e.g., 820 and 830) affiliated with business entity 880 using conventional techniques. Similarly, using conventional techniques, business entity 890 is unable to monitor wireless IP usage by subscribers associated with other business entities when the subscribers access wireless networks affiliated with other business entities. As such, examples of the present disclosure enable payment tracking (e.g., by a business entity affiliated with a wireless network, by a third party, etc.) by monitoring and/or collecting information related to the wireless IP usage on the portable device (e.g., 120a-120c, 300, 500, 700, etc.) itself. Since the portable device (e.g., 120a-120c, 300, 500, 700, etc.) can monitor its own wireless IP usage regardless of which wireless network (or type of wireless network) it may be communicating with at any given time, embodiments enable collection of complete and representative information related to payment tracking for the wireless IP usage of the portable device (e.g., 120a-120c, 300, 500, 700, etc.).

Although wireless networks 810-860 are depicted in FIG. 9 as adjoining portions without gaps, it should be appreciated that the wireless networks may be alternatively arranged (e.g., with one or more gaps, etc.) in other examples. Additionally, it should be appreciated that a larger or smaller number of wireless networks may be present in other examples. Although wireless networks are apportioned to only two business entities in FIGS. 8 and 9, it should be appreciated that the wireless networks may be apportioned to a larger or smaller number of business entities in other examples. Further, it should be appreciated that a large or smaller number of wireless networks may be apportioned to the business entities in other examples.

Computer System Platform

Figure 10:
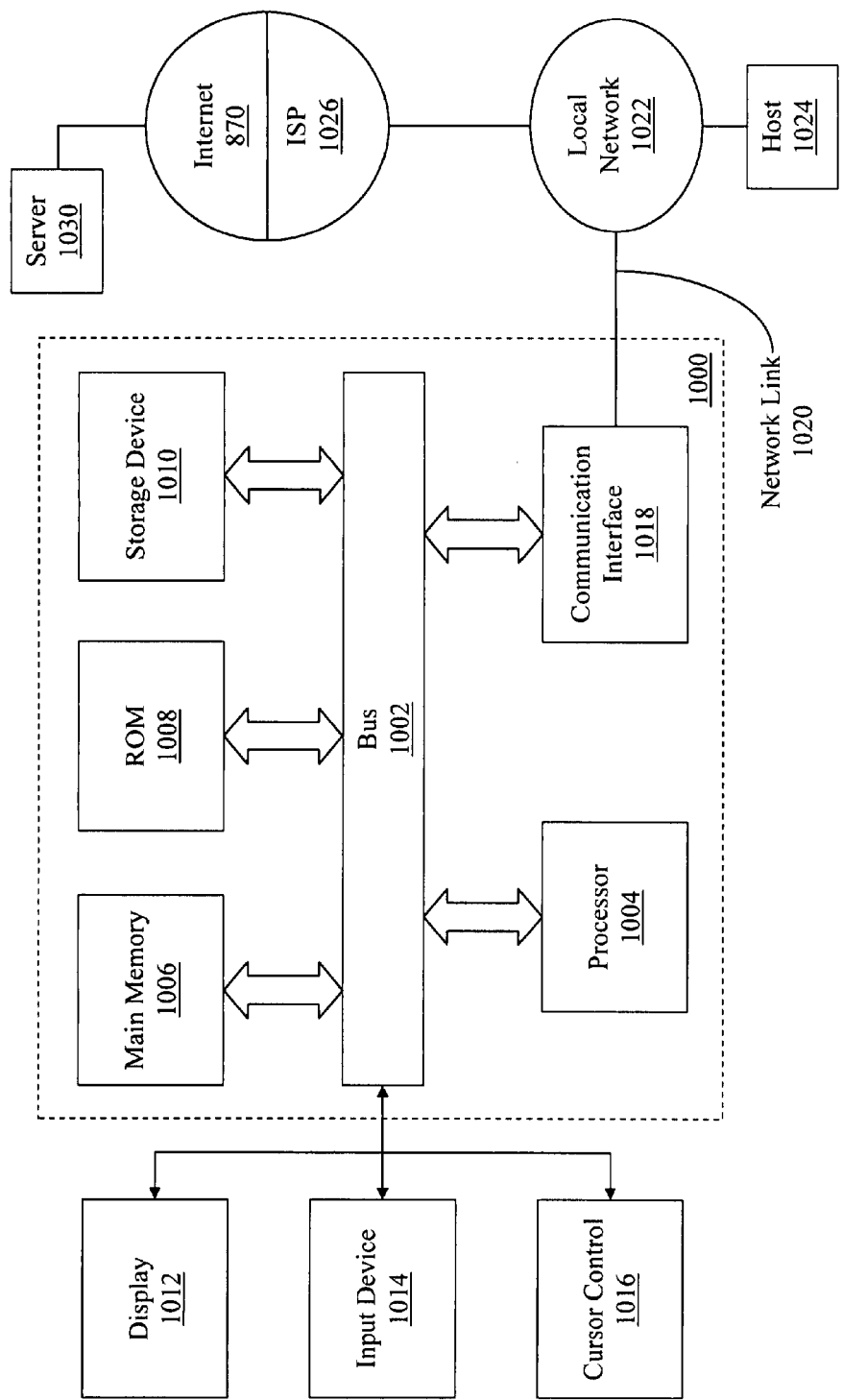
FIG. 10 shows an example computer system upon which examples of the present disclosure may be implemented.

FIG. 10 shows examples computer system 1000 upon which examples of the present disclosure may be implemented. With reference to FIG. 10, portions of the present disclosure are comprised of computer-readable and computer-executable instructions that reside, for example, in computer system 1000 which may be used as a part of a general purpose computer network (not shown). It is appreciated that computer system 1000 of FIG. 10 is merely exemplary. As such, the present disclosure can operate within a number of different computer systems including general-purpose computer systems, embedded computer systems, laptop computer systems, hand-held computer systems, portable computer systems (e.g., portable devices), and stand-alone computer systems.

In the present example, computer system 1000 includes an address/data bus 1002 for conveying digital information between the various components, a central processor unit (CPU) 1004 coupled to bus 1002 for processing the digital information and instructions, a volatile main memory 1006 coupled to bus 1002 comprised of volatile random access memory (RAM) for storing the digital information and instructions, and a non-volatile read only memory (ROM) 1008 coupled to bus 1002 for storing information and instructions of a more permanent (e.g., non-transitory) nature. In addition, computer system 1000 may also include a data storage device 1010 (e.g., a magnetic, optical, floppy, tape, or other drive) coupled to bus 1002 for storing larger amounts of data. It should be noted that the software program for performing the method of collecting information about usage of a portable device of the present disclosure may be stored in main memory 1006, ROM 1008, storage device 1010, registers within CPU 1004 (not shown), and/or in an external storage device (not shown) (e.g., all of which may be non-transitory machine readable media).

As shown in FIG. 10, computer system 1000 may be coupled via bus 1002 to an optional display device 1012 (e.g., a CRT monitor, LCD monitor, etc.) for displaying information received from computer system 1000. An optional input device 1014 (e.g., an alphanumeric keyboard) may also be coupled to computer system 1000 via bus 1002 for communicating information and command selections to CPU 1004. Cursor control device 1016 (e.g., a mouse, trackball, light pen, etc.) may also be coupled to computer system 1000 via bus 1002 for communicating direction information and command selections to CPU 1004 and for controlling cursor movement (e.g., on display 1012). Additionally, computer system 1000 can include a mechanism for emitting an audible signal (not shown).

Computer system 1000 may also include a communication interface 1018 coupled to bus 1002. Communication interface 1018 provides a two-way data communication coupling to local network 1022 via network link 1020. For example, communication interface 1018 may be an integrated services digital network (ISDN) device or modem to provide a data communication connection to a corresponding type of telephone line. As another example, communication interface 1018 may be a local area network (LAN) device to provide a data communication connection to a compatible LAN. And as yet another example, network link 1020 may comprise a wireless connection between communication interface 1018 and local network 1022. Regardless of the implementation utilized, communication interface 1018 may send and receive electrical, electromagnetic, and/or optical signals that carry digital data streams representing various types of information.

As shown in FIG. 10, network link 1020 may provide data communication through one or more networks to other data devices. For example, network link 1020 may provide a connection through local network 1022 to a host computer 1024 or to data equipment operated by internet service provider (ISP) 1026. ISP 1026 in turn provides data communication services through the worldwide packet data communication network, now commonly referred to as the "Internet" 870. Local network 1022 and Internet 870 may use electrical, electromagnetic, and/or optical signals to convey digital data streams. The signals through the various networks and network link 1020, which carry digital data to and from computer system 1000, are exemplary forms of carrier waves transporting information.

Accordingly, computer system 1000 can send and receive messages through networks(s), network link 1020, and communication interface 1018. For example, server 1030 may transmit a requested code for an application program through Internet 870, ISP 1026, local network 1022, and communication interface 1018. The received code may be executed by CPU 1004 upon receipt, and/or be stored in one of the coupled memory devices (e.g., storage device 1010, ROM 1008, RAM 1006, etc.) for later execution.

In the foregoing specification, examples of the disclosure have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of collecting information on a mobile device about interactive gaming via a hosted service over the Internet, the method comprising:
    monitoring usage of the mobile device, the monitoring performed on the mobile device while the mobile device is being used for the interactive gaming; and
    via the monitoring on the mobile device, collecting usage information on the mobile device, the usage information corresponding to the interactive gaming between the mobile device and a second end-user device in communication with the mobile device via the hosted service over the Internet, and the usage information indicative of a first interaction between the mobile device and a server of the hosted service during the interactive gaming.

2. The method of claim 1 further including collecting user inputs associated with the interactive gaming.

3. The method of claim 1, wherein the usage information includes at least one of an interaction type, an interaction frequency, or an interaction duration associated with the interactive gaming.

4. The method of claim 1 further including determining a quantity of end-user devices participating in the interactive gaming.

5. The method of claim 1 further including collecting at least one of a time or a location associated with the interactive gaming.

6. A mobile device adapted to collect information about interactive gaming performed on the mobile device via a hosted service over the Internet, the mobile device comprising:
    a processor; and
    a memory including instructions that, when executed, cause the processor to at least:
        monitor interactive gaming usage of the mobile device while the mobile device is being used for the interactive gaming; and
        collect usage information corresponding to the interactive gaming between the mobile device and a second end-user device in communication with the mobile device via the hosted service over the Internet.

7. The mobile device of claim 6, wherein the instructions further cause the processor to collect user inputs associated with the interactive gaming.

8. The mobile device of claim 6, wherein the usage information includes at least one of an interaction type, an interaction frequency, or an interaction duration associated with the interactive gaming.

9. The mobile device of claim 6, wherein the instructions further cause the processor to determine a quantity of end-user devices participating in the interactive gaming.

10. The mobile device of claim 6, wherein the instructions further cause the processor to collect at least one of a time or a location associated with the interactive gaming.

11. An article of manufacture comprising instructions that, when executed, cause a processor of a mobile device to at least:
    monitor usage of interactive gaming on the mobile device; and
    collect usage information corresponding to the interactive gaming between the mobile device and a second end-user device in communication with the mobile device via a hosted service over the Internet, the usage information indicative of on-network gaming when the interactive gaming occurs via a first network of a communication service carrier providing a wireless service subscription to the mobile device, and the usage information indicative of off-network gaming when the interactive gaming occurs via a second network not affiliated with the communication service carrier providing the wireless service subscription to the mobile device.

12. The article of manufacture of claim 11, wherein the instructions further cause the processor to collect user inputs associated with the interactive gaming.

13. The article of manufacture of claim 11, wherein the usage information includes at least one of an interaction type, an interaction frequency, or an interaction duration associated with the interactive gaming.

14. The article of manufacture of claim 11, wherein the instructions further cause the processor to determine a quantity of end-user devices participating in the interactive gaming.

15. The article of manufacture of claim 11, wherein the instructions further cause the processor to collect at least one of a time or a location associated with the interactive gaming.

16. The method of claim 1, wherein the usage information is indicative of a second interaction between the mobile device and the second end-user device.

17. A mobile device adapted to collect information about interactive gaming performed on the mobile device via a hosted service over the Internet, the mobile device comprising:
    a processor; and a memory including instructions that, when executed, cause the processor to at least:

monitor usage of interactive gaming on the mobile device; and collect usage information corresponding to the interactive gaming between the mobile device and a second end-user device in communication with the mobile device via the hosted service over the Internet, the usage information indicative of on-network gaming when the interactive gaming occurs via a first network of a communication service carrier providing a wireless service subscription to the mobile device, and the usage information indicative of off-network gaming when the interactive gaming occurs via a second network not affiliated with the communication service carrier providing the wireless service subscription to the mobile device.

18. The mobile device of claim 17, wherein the instructions further cause the processor to collect user inputs associated with the interactive gaming.

19. The mobile device of claim 17, wherein the usage information includes at least one of an interaction type, an interaction frequency, or an interaction duration associated with the interactive gaming.

20. The mobile device of claim 17, wherein the instructions further cause the processor to determine a quantity of end-user devices participating in the interactive gaming.

21. The mobile device of claim 17, wherein the instructions further cause the processor to collect at least one of a time or a location associated with the interactive gaming.

22. A method of collecting information on a mobile device about interactive gaming via a hosted service over the Internet, the method comprising:

monitoring usage of interactive gaming on the mobile device; and collecting usage information corresponding to the interactive gaming between the mobile device and a second end-user device in communication with the mobile device via the hosted service over the Internet, the usage information indicative of on-network gaming when the interactive gaming occurs via a first network of a communication service carrier providing a wireless service subscription to the mobile device, and the usage information indicative of off-network gaming when the interactive gaming occurs via a second network not affiliated with the communication service carrier providing the wireless service subscription to the mobile device.

23. The method of claim 22, wherein the instructions further cause the processor to collect user inputs associated with the interactive gaming.

24. The method of claim 22, wherein the usage information includes at least one of an interaction type, an interaction frequency, or an interaction duration associated with the interactive gaming.

25. The method of claim 22, wherein the instructions further cause the processor to determine a quantity of end-user devices participating in the interactive gaming.

26. The method of claim 22, wherein the instructions further cause the processor to collect at least one of a time or a location associated with the interactive gaming.

* * * * *